US006717103B2

(12) United States Patent
Ellenkamp

(10) Patent No.: US 6,717,103 B2
(45) Date of Patent: Apr. 6, 2004

(54) METHOD AND APPARATUS FOR FORMING A NOZZLE IN AN ELEMENT FOR AN INK JET PRINT HEAD

(75) Inventor: Hendrik Willem Ellenkamp, Venlo (NL)

(73) Assignee: OCE-Technologies B.V., Venlo (NL)

( * ) Notice: Subject to any disclaimer, the term of this patent is extended or adjusted under 35 U.S.C. 154(b) by 0 days.

(21) Appl. No.: 10/354,997

(22) Filed: Jan. 31, 2003

(65) Prior Publication Data

US 2003/0136771 A1 Jul. 24, 2003

Related U.S. Application Data

(62) Division of application No. 09/994,875, filed on Nov. 28, 2001, now abandoned.

(30) Foreign Application Priority Data

Nov. 29, 2000 (NL) ............................................ 1016735

(51) Int. Cl.[7] ................................................ B23K 26/38
(52) U.S. Cl. .................................................. 219/121.71
(58) Field of Search ......................... 219/121.71, 121.7, 219/121.67, 121.68, 121.69, 121.72, 121.78, 121.79, 121.8, 121.85, 121.73; 430/945; 264/154, 400

(56) References Cited

U.S. PATENT DOCUMENTS 4,786,358 A * 11/1988 Yamazaki et al. ............ 216/48
5,305,015 A 4/1994 Schantz et al.
5,378,137 A * 1/1995 Asakawa et al. ........ 425/174.4
5,502,471 A 3/1996 Obermeier et al.
5,574,486 A 11/1996 Whitlow et al.
5,802,687 A 9/1998 Thiel et al.
5,828,390 A 10/1998 Thiel
5,948,289 A * 9/1999 Noda et al. ............ 219/121.69
6,080,959 A * 6/2000 Komplin ................ 219/121.71
6,183,064 B1 2/2001 Murthy et al.
6,303,042 B1 10/2001 Hawkins et al.
6,387,601 B1 * 5/2002 Abe ........................... 430/320
6,397,467 B1 6/2002 Werner et al.

FOREIGN PATENT DOCUMENTS

EP 2-454152 A2 10/1991
EP 2-624471 A2 11/1994
EP 2-811499 A2 12/1997
WO WO 1-9633839 A1 10/1996
WO WO 1-30800 A1 6/2000

* cited by examiner

*Primary Examiner*—Tom Dunn
*Assistant Examiner*—Jonathan Johnson
(74) *Attorney, Agent, or Firm*—Birch, Stewart, Kolasch & Birch, LLP

(57) ABSTRACT

A method of forming a nozzle element for an ink jet print head, wherein material is removed from the nozzle element by means of a laser to form the nozzle. A mask is irradiated with a laser beam in such manner that at least one sub-beam is passed through the mask, whereafter the material is removed by means of the sub-beam. Inhomogeneity of the laser beam is compensated for by using, for each nozzle laser, radiation originating from different parts of the laser beam, whereby the nozzle is formed with an "average" laser beam.

9 Claims, 7 Drawing Sheets

METHOD AND APPARATUS FOR FORMING A NOZZLE IN AN ELEMENT FOR AN INK JET PRINT HEAD

This application is a divisional of co-pending application Ser. No. 09/994,875, filed on Nov. 28, 2001, the entire contents of which are hereby incorporated by reference and for which priority is claimed under 35 U.S.C. §120; and this application claims priority of Application No. 1016735 filed in The Netherlands on Nov. 29, 2000 under 35 U.S.C. §119.

BACKGROUND OF THE INVENTION

1. Field of the Invention

The present invention relates to a method of forming a nozzle in an element for an ink jet print head, wherein, by the use of a laser, material is removed from the element and the nozzle is formed. The method includes the steps of irradiating a mask with a laser beam in such a manner that a sub-beam is passed through the mask, and removing the material by means of the sub-beam. The present invention also relates to a nozzle element with substantially identical nozzles, an ink jet print head provided with said nozzle element, and an ink jet printer provided with such a print head.

A method of this kind is known from U.S. Pat. No. 5,305,015. The element in which the nozzle is formed is used as part of a print head for an ink jet printer. A print head of this kind typically comprises a series of substantially closed ink ducts each leading from a relatively large opening into the surface of the print head. In one embodiment, these openings form a pattern of two parallel rows. A flat element is fixed against this surface of the print head and contains a number of nozzles in a pattern corresponding to the pattern of the openings. Consequently, each duct finally leads into a small accurate nozzle. Each duct is provided with drive means comprising, for example, a thermal element or a piezo-actuator, with which drive means a rapid pressure rise can be generated in the duct so that an ink drop is ejected via the corresponding nozzle. By actuating the ink ducts, image-wise, it is possible in this way to form an image, built up of a number of individual ink drops, on a receiving material.

With ink jet printers of this kind, the print quality depends very much on the characteristics of the nozzles. The shape of the nozzles, the size (cross-section) and the angle they include with the duct, particularly determine important properties of the drops. The properties include, in particular, the drop size, the direction in which the drops are ejected, and the speed that they have at the instant of ejection. In addition to providing nozzles in separate elements, for example flexible metal or plastic films that are fixed on the print head, it is also possible to form the nozzles directly in an element provided with ink ducts.

Thus an element of a flexible plastic is transported through a processing station in which a mask is irradiated with a laser beam, the mask being formed with a pattern of laser-passing elements. The laser beam originates from an excimer laser, for example of the $F_2$, ArF, KrCl, KrF or XeCl type. A laser beam of this kind is excellent for forming nozzles because a high energy density can be obtained over a small area. The pattern of laser-passing elements in the mask results in a pattern of sub-beams which are passed through the mask. With each of these sub-beams material is removed from the tape with the formation of a nozzle. A nozzle is finished when a continuous hole of a specific shape has been formed in the element. Since the number of sub-beams originating from the laser beam is much less than the total number of nozzles to be provided, the element is moved with respect to the mask and the laser beam after a first series of nozzles has been formed, whereafter a following series of nozzles is formed. This method is known as the step-and-repeat process.

This method has a significant disadvantage. The composition of the laser beam, particularly the angle at which the radiation is propagated in the beam and the intensity of this radiation, is not exactly identical over the entire width of the beam. This means that the composition of a sub-beam passed through the mask is also not exactly known.

As a result, the characteristics of the nozzle formed by processing with this sub-beam are difficult to adjust, if not impossible. Accordingly, the spread in characteristics over the nozzles is relatively considerable. Moreover, in the known method, nozzles may be formed which deviate considerably from the required nozzle shape. For example, it is quite possible that nozzles are formed which are fairly skewed with respect to the duct or have a much larger cross-section than required. This has adverse effects on the print quality.

SUMMARY OF THE INVENTION

The object of the present invention is to provide an ink jet print head nozzle element in a simple manner, with which good print quality can be obtained. To this end, a method has been discovered wherein the laser beam is moved with respect to the mask in a direction substantially parallel to the mask so that during the removal of the material the sub-beam originates from a series of different parts of the laser beam, extending in said direction. In this method the nozzle is formed by a kind of “average” of the laser beam.

For this reason, the spread in nozzle characteristics over the nozzles formed is relatively small and it is a simple matter to form nozzles which correspond well to the required nozzle shape.

In this embodiment, the laser beam is moved with respect to the mask so that the laser-passing element of the mask is always irradiated with a different part of the laser beam, so that a different part of the laser beam is also always passed as a sub-beam. In this way, deviations in the laser beam, and hence in the sub-beam with which the nozzle is formed, are averaged out over a larger number of parts of said beam. This has the advantage that the consequences of systematic faults in the laser beam can readily be eliminated. In addition, the formation of the nozzle can be controlled more easily because a change in the setting of the laser beam has less rigorous effects for the “average” beam than for each of the parts in the beam.

In another embodiment, the series of different parts of the laser beam forms a contiguous row. The advantage of this method is that the mask can be continuously irradiated with the laser beam. This provides a simpler method and also has the advantage that there are no sharp transitions at the transition from one part of the laser beam to the other. Instead, the laser beam is moved over the mask in one fluid movement.

In yet another embodiment, the series extends over substantially the entire width of the beam in the said direction. Since the laser beam used is often symmetrical in respect of its properties, a very good averaging out of deviations in the laser beam takes place in this way, in which the nozzle is formed by using substantially the entire width of the laser beam. The result is a nozzle which is substantially symmetrical, and this benefits print quality.

In one preferred embodiment, the laser beam is moved with respect to the mask at a substantially constant speed.

This not only simplifies the method according to the invention, but also contributes to better averaging over the beam. In this way symmetry of the nozzles is very satisfactorily guaranteed and an improvement in print quality is obtained.

In a further embodiment, the mask and the element are moved while the laser beam is stationary. In this embodiment, the laser beam can be fixed in a processing station. The mask and the element are optically fixed with respect to one another during the movement so that the sub-beam passed by the mask is always imaged on the same location of the element.

In one preferred embodiment, the sub-beam is imaged on the element by means of a lens. This embodiment has a number of advantages. Firstly, in this way a relatively coarse mask, i.e. one having a relatively large laser-passing element, can be used because any required reduction on the element can be obtained by means of the lens. In addition, in this way the radiation intensity of the laser beam at the mask can be kept relatively low, thus preventing damage to the mask. Also, the use of the lens gives greater freedom in respect of the layout of the laser beam, mask and element with respect to one another.

In a further preferred embodiment, at least two sub-beams are passed through the mask. This method has a very important advantage over the known method. In the known method, the homogeneity of the laser beam is carefully controlled and adjusted so that at least two sub-beams passed through the mask are as far as possible identical. In this way, the nozzles formed are prevented from differing from one another as far as possible, i.e. in respect of shape, size and angle. This control and adjustment require expensive measuring and control equipment, but is necessary because such differences between the nozzles result in a perceptible deterioration in print quality. In the method according to the invention, the nozzles formed have been found to be substantially identical, without having to control and adjust the homogeneity of the laser beam. This is a consequence of the fact that each nozzle is formed with substantially the same "average" over the laser beam. An additional advantage of this method is that it is possible to use a very inhomogeneous and hence cheap laser beam. Particularly when the nozzles are situated in one row having the same direction as the direction in which the laser beam is moved with respect to the mask, the nozzles are found to be practically identical.

In a further embodiment, more nozzles are formed in the element than there are sub-beams originating from the laser beam. This embodiment has the advantage that a laser beam can be selected which has a small cross-section, this being relatively inexpensive. By moving the element with respect to the laser beam it is nevertheless possible to form a large number of nozzles.

In yet another embodiment, the laser beam is used in such manner that a projection of the laser beam on the mask has a longitudinal direction, the projection in the longitudinal direction being defined by substantially parallel lines. This embodiment offers the advantage that the positioning of the beam with respect to the laser-passing elements of the mask need not be as accurate: since the laser beam is substantially of equal width throughout, each nozzle will be formed with a substantially identical total laser intensity. This is to the benefit of the uniformity of the nozzles, and hence the print quality of an ink jet printer equipped with a nozzle element according to the invention.

The present invention also relates to a nozzle element for an ink jet print head, the nozzle element having substantially identical nozzles and being obtainable by a method according to the invention. An element of this kind has the advantage that the ink drops ejected from the nozzles have the same properties as far as possible. An ink jet print head provided with nozzle element of this kind has the advantage that the print properties differ as little as possible over the length of the head. With an ink jet printer provided with a print head of this kind it is possible to generate images of high quality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
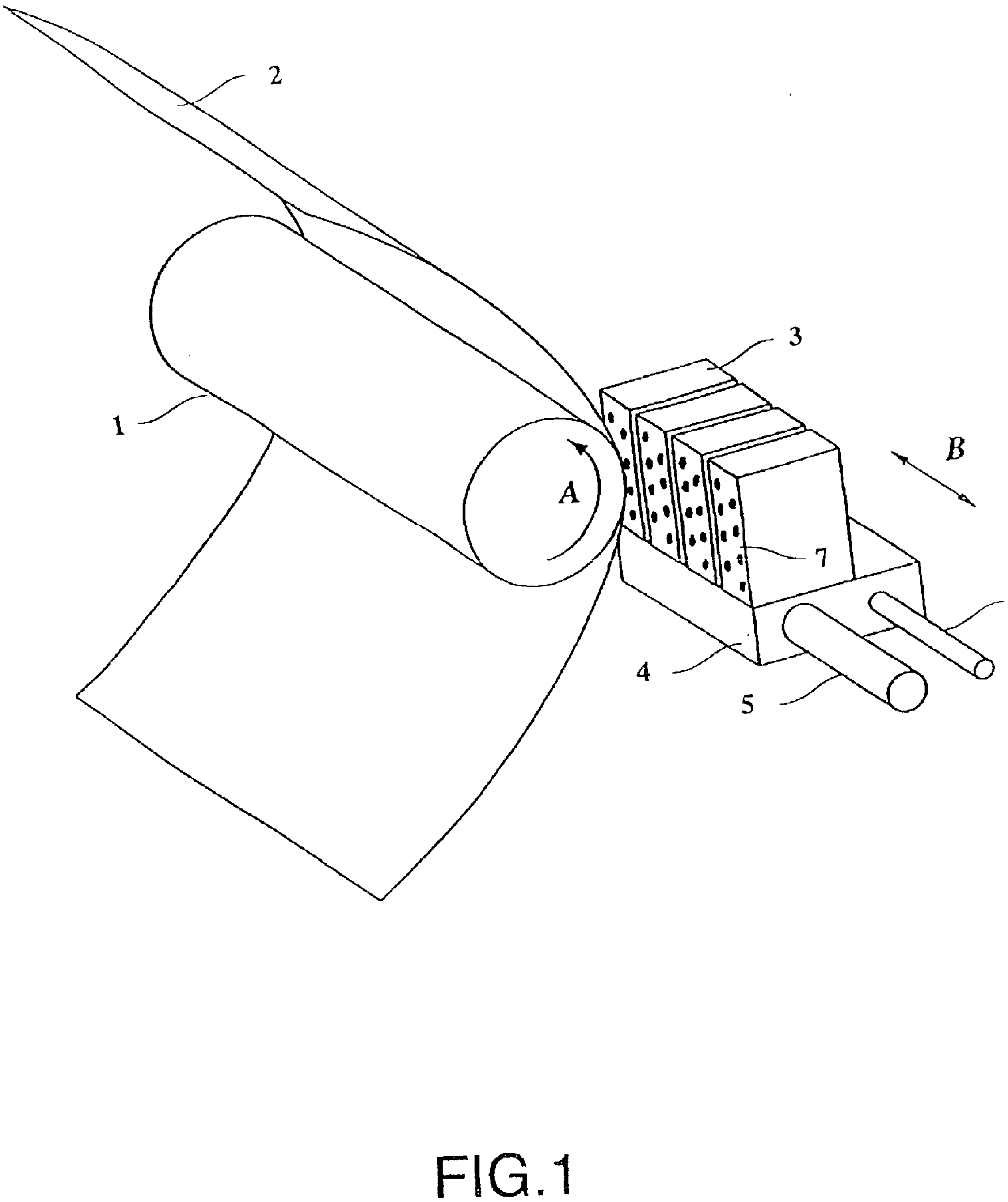
FIG. 1 is a diagram of an ink jet printer.

FIG. 1 diagrammatically illustrates an ink jet printer. In this embodiment, the printer comprises a roller 1 to support a substrate 2 and feed it along the four print heads 3. The roller 1 is rotatable about its axis as indicated by arrow A. A scanning carriage 4 carries the four print heads 3 and can be reciprocated in the direction indicated by the double arrow B, parallel to roller 1. In this way, the print heads 3 can completely scan the receiving substrate 2, for example a sheet of paper. The carriage 4 is guided on rods 5 and 6 and is driven by suitable means (not shown).

In the embodiment as shown in the drawing, each print head comprises eight internal ink ducts (not shown), each with its own nozzle 7, which nozzles form, on each print head, two substantially parallel rows of four nozzles. In this embodiment, each of said rows is substantially perpendicular to the axis of roller 1. In one practical embodiment of an ink jet printer, the number of ink ducts per print head will be many times greater, typically about 200 to 400 nozzles per head. Each ink duct is provided with means (not shown) for pressurising ink in the duct, so that an ink drop is ejected via the corresponding nozzle 7 from the duct in the direction of the receiving material. Means of this kind may, for example, be a thermistor or a piezo-electric actuator. To actuate these means, each duct is also provided with an electric drive circuit (not shown). If the means are actuated image-wise, then an image is formed which is built up of ink drops on substrate 2. When a substrate is printed with a printer of this kind, said substrate, or part thereof, is divided up (imaginarily) into fixed locations forming a regular field of pixel rows and pixel columns. In one embodiment the pixel rows are perpendicular to the pixel columns. The resulting separate locations can each be provided with one or more ink drops. The number of locations per unit length in the directions parallel to the pixel rows and pixel columns is termed the resolution of the printed image, which is indicated, for example, as 400×600 d.p.i. ("dots per inch").

Figure 2:
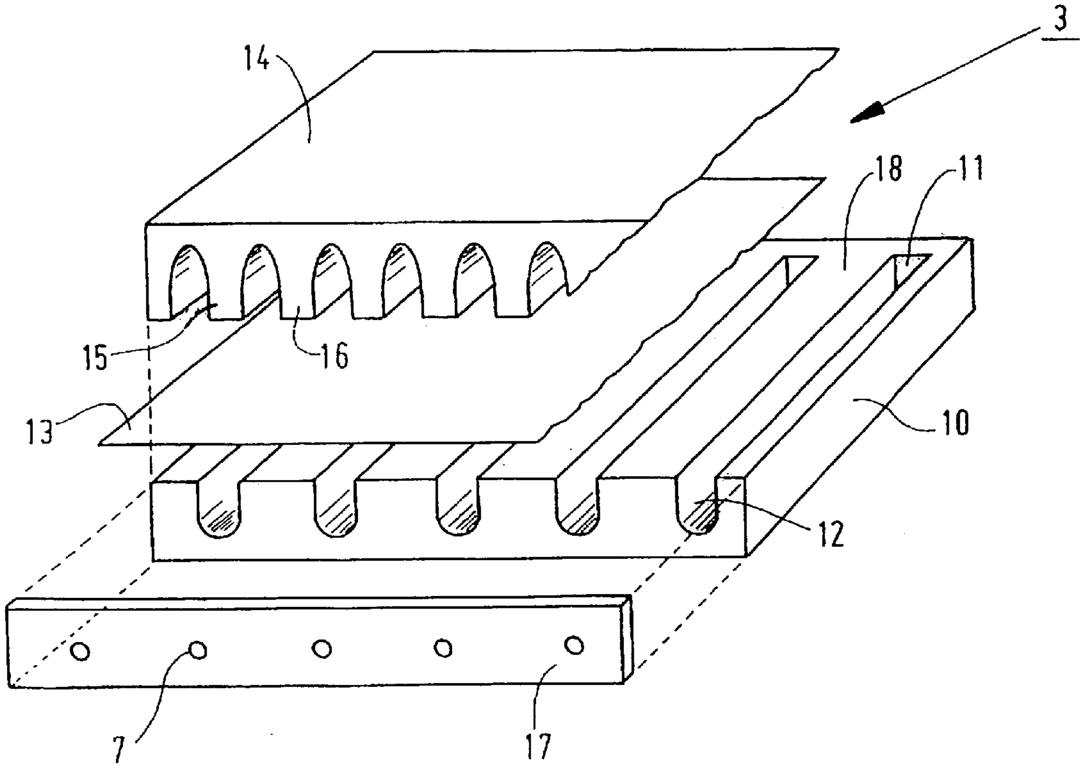
FIG. 2 is an example of an ink jet print head.

FIG. 2 is an example of an ink jet print head 3. For simplification, a head is shown which comprises just one row of ink ducts and the various parts are shown separately from another.

The head 3 is made up of a duct plate 10 in which a row of parallel ducts 11 is formed. At the front of the duct plate, the ducts lead into an outlet opening 12. At the back, the ducts are bounded by a wall of the duct plate. At the bottom, the ducts are connected via a narrow opening (not shown) to an ink reservoir (not shown) so that they can be filled with liquid ink (not shown). At the top, the duct plate is covered by an actuator film 13 so that the ducts are closed at the top. A piezo-electric actuator plate 14 is disposed on this film. Said actuator plate 14 is provided with a parallel row of piezo-electric fingers 15 and 16. The fingers 15 are disposed above the ink ducts. The fingers 16 bear, via the film 13, on the dams 18 which separate the ink ducts 11 from one another. In this embodiment, the front of the duct plate 10 is covered by a nozzle element 17, in this example a thin strip of a metal alloy in which the nozzles 7 are formed. Here the row of nozzles corresponds to the row of outlet openings of the ink ducts 11. In an alternative embodiment, in which there are no outlet openings 12 but the ink ducts are also bounded at the front of the duct plate 10 by a wall, the nozzles are formed directly in the duct plate 10.

By actuation of a piezo-electric finger 15 so that it expands in the direction of the duct plate, the actuator film 13 deflects in the corresponding ink duct 12 so that the pressure in the duct increases. The adjoining fingers 16 in these conditions provide adequate support for the piezo-electric plate 14. By activating the finger 15 in the correct manner, the pressure rise results in an ink drop being ejected from the ink duct through the corresponding nozzle.

Figure 3A:
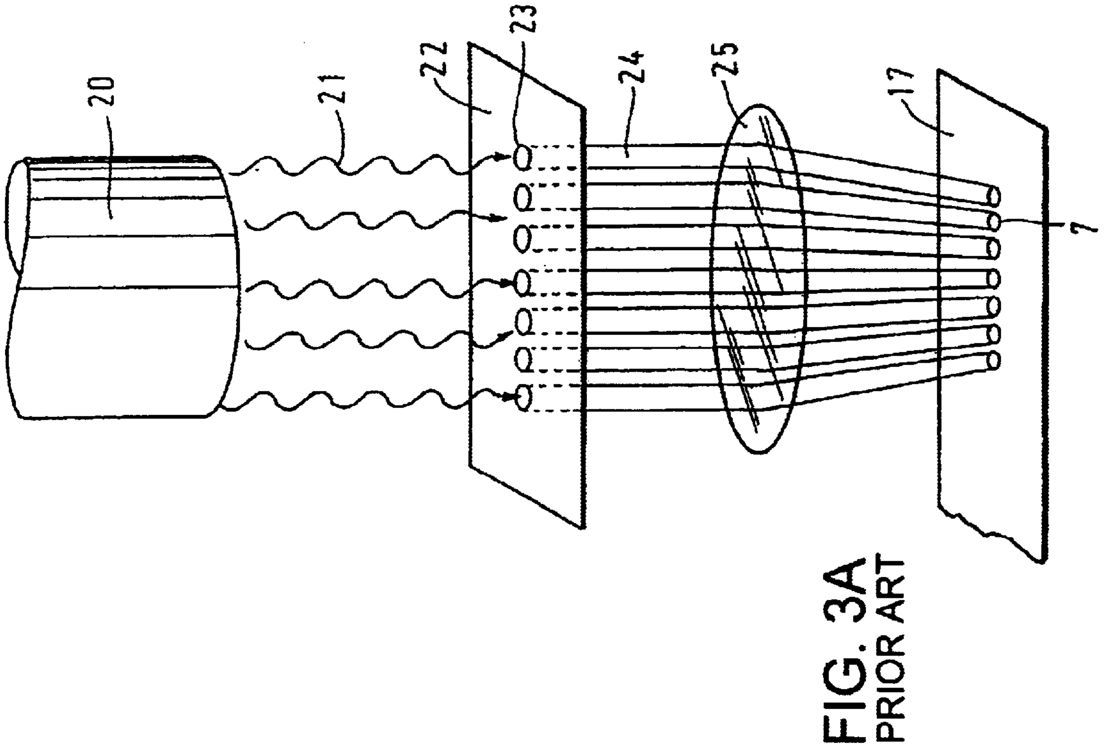
FIG. 3A PRIOR ART
FIG. 3, which is made up of FIGS. 3*a* and 3*b*, shows the method for forming nozzles as known in the prior art.
Figure 3B:
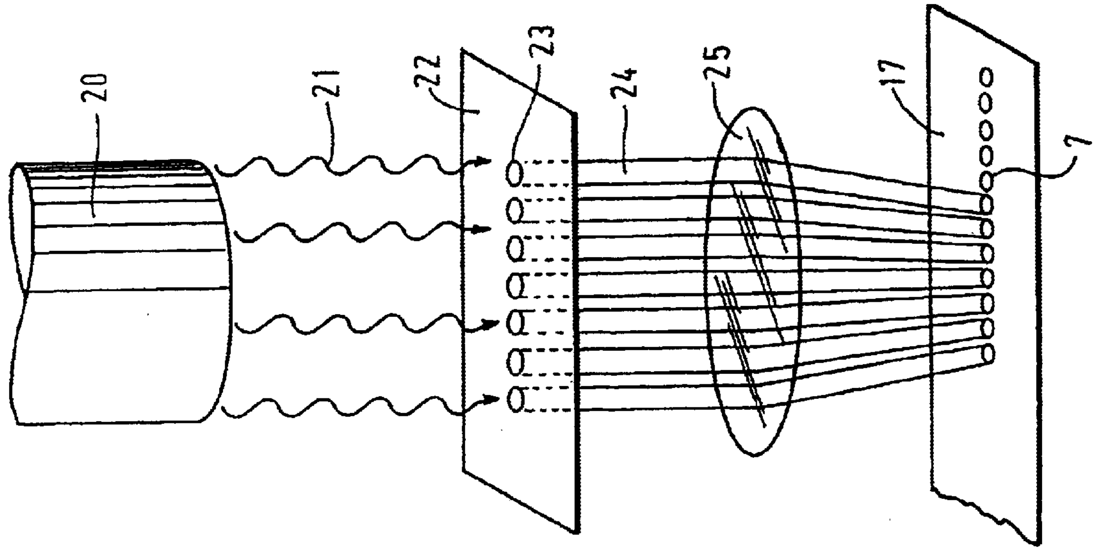
FIG. 3B PRIOR ART

FIG. 3, which is made up of FIGS. 3*a* and 3*b*, shows the method of applying nozzles as known in the prior art. In this method, a mask 22 is irradiated with a laser beam 21 from a source 20, the mask being made of a material which is opaque to laser light and being provided with a row of elements 23 which transmit laser light. A number of sub-beams 24 are passed through the mask. These sub-beams are then converged by means of a lens 25. The laser source 20, the mask 22 and the lens 25 are disposed in a processing station (not shown) and are at all times fixed with respect to one another.

To provide an element 17—in this case a flexible polyimide film—with nozzles, the film is conveyed along the processing station while the laser source 20 is switched off. As soon as the element occupies the correct position with respect to the mask 22, the laser source is switched on and the sub-beams 24 are imaged on the element as shown in FIG. 3*a*. As a result of the converging action of lens 25, the row of sub-beams is imaged a number of times smaller on the element 17 then it emerges from mask. As a result of the action of the sub-beams on the element, material is removed from said element (this procedure being known as laser ablation), so that a number of nozzles 7 is formed equal to the number of laser-passing elements 23 of the mask. Any nonhomogeneity in the laser beam results in a different removal of material on each of the locations of the element, so that the resulting series of nozzles differ from one another, for example in shape, apex angle, size, direction, and so on. As a result, the ink drops ejected by each of the ducts will also be different. After the nozzles have been formed, the laser source 20 is switched off and the element 17 is conveyed on until the element occupies the correct position with respect to the mask so that the next series of nozzles can be formed in the element. The laser source 20 is then switched on again so that the element undergoes a new processing. This is shown in FIG. 3*b*. In this way, which is known as step-and-repeat, it is possible to obtain a nozzle element with a long row of nozzles using a relatively small laser beam.

Figure 4:
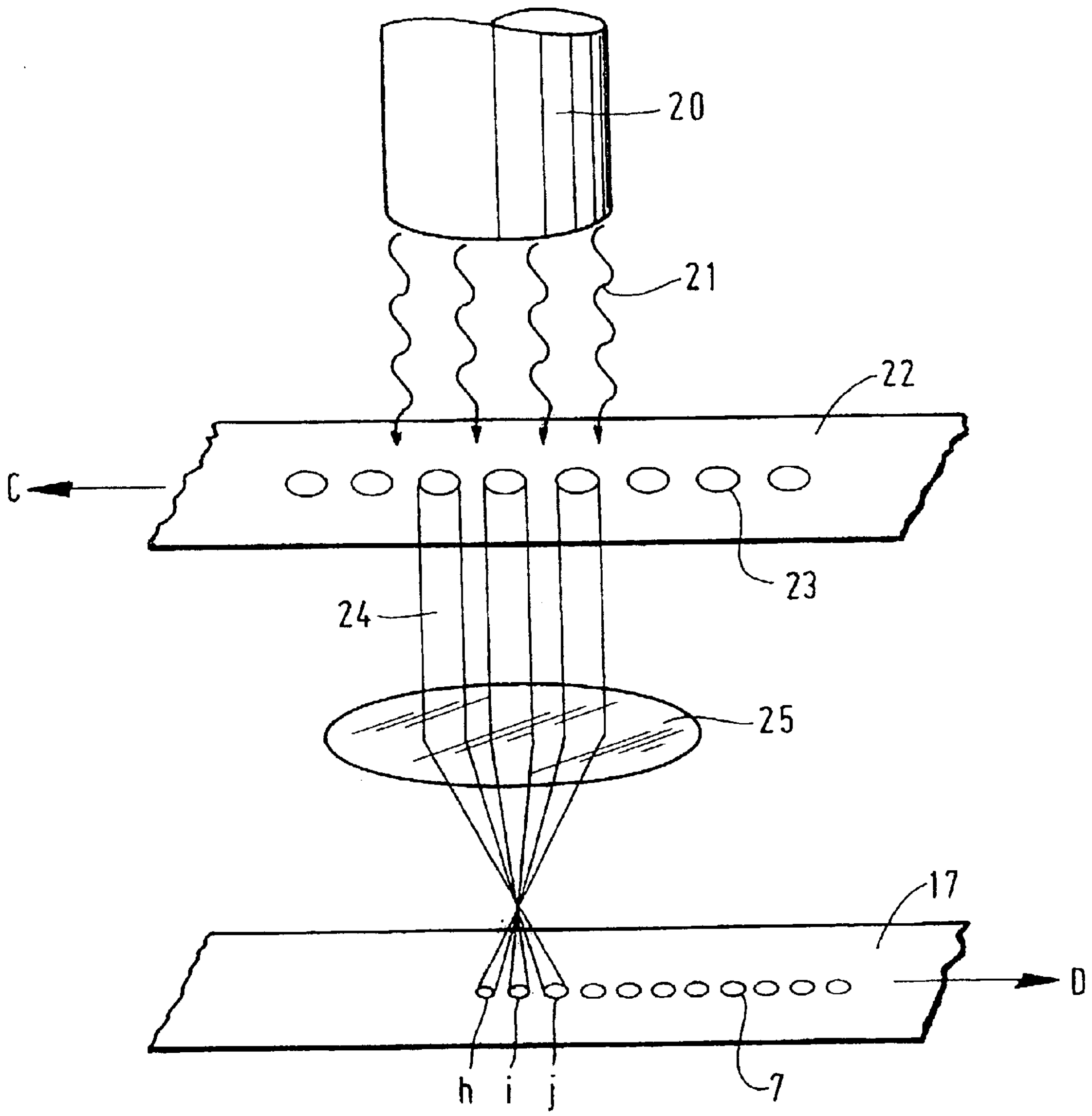
FIG. 4 shows a first example of a method according to the present invention.

FIG. 4 shows a first example of the method according to the present invention. In this embodiment, the laser source 20 forms part of the fixed arrangement in a processing station (not shown). During the processing of the element 17, the mask 22, which is provided with laser-passing elements 23, is irradiated with the laser beam 21. In this example, the mask 22 passes three sub-beams 24, which are imaged by a lens 25 on the element 17. In one practical embodiment, the ratio between the cross-section of the laser beam and the size of the elements 23 will be such that some tens of sub-beams form.

By moving the mask 22 with respect to the laser beam 21 in a direction C substantially perpendicular to the beam, each laser-passing element 23 traverses substantially the same part of the laser beam 21. If the element 17 which, in this embodiment, is situated just after the focal point of the lens 25, is moved at the correct speed in a direction D substantially in the opposite direction to C, each sub-beam 24 remains fixed at the same location of the element 17. In these conditions the speed of said elements 17 will be a number of times smaller than the speed of mask 23, this number being equal to the reduction factor with which the sub-beams are imaged on the element. In this example, the sub-beam 24 on the furthest left is imaged at location j of the element. This sub-beam has already covered practically the entire distance through the laser beam and the corresponding nozzle is according practically completely formed at location j. As soon as mask 22 is moved slightly further in the direction C, the corresponding laser-passing element will no longer be irradiated by the laser beam 21. By appropriate choice of the intensity of the laser beam, the size of the laser-passing elements, the reduction factor of the lens, and the speeds of movement of the mask and the element, the nozzle at location j will just be completed when the corresponding radiation-transmitting element leaves the laser beam.

At location h, in the processing stage shown in this Figure, the formation of the nozzle has just started. The corresponding laser-transmitting element 23 has just come into the laser beam for the first time, so that the emerging sub-beam is imaged at location h. Location i is irradiated with a second sub-beam which continues somewhat longer so the nozzle at this location is already somewhat further formed. By moving the mask 22 and the element 17 in the directions indicated, each laser-passing element 23 traverses substantially the same part of the laser beam 21. As a result, considered in the course of time, material will be removed at each location in practically the same way so that the nozzles are substantially identical. Since the mask in this embodiment has least as many laser-passing elements as there are nozzles to be formed in the element, all the nozzles can be formed in one continuous operation.

Figure 5:
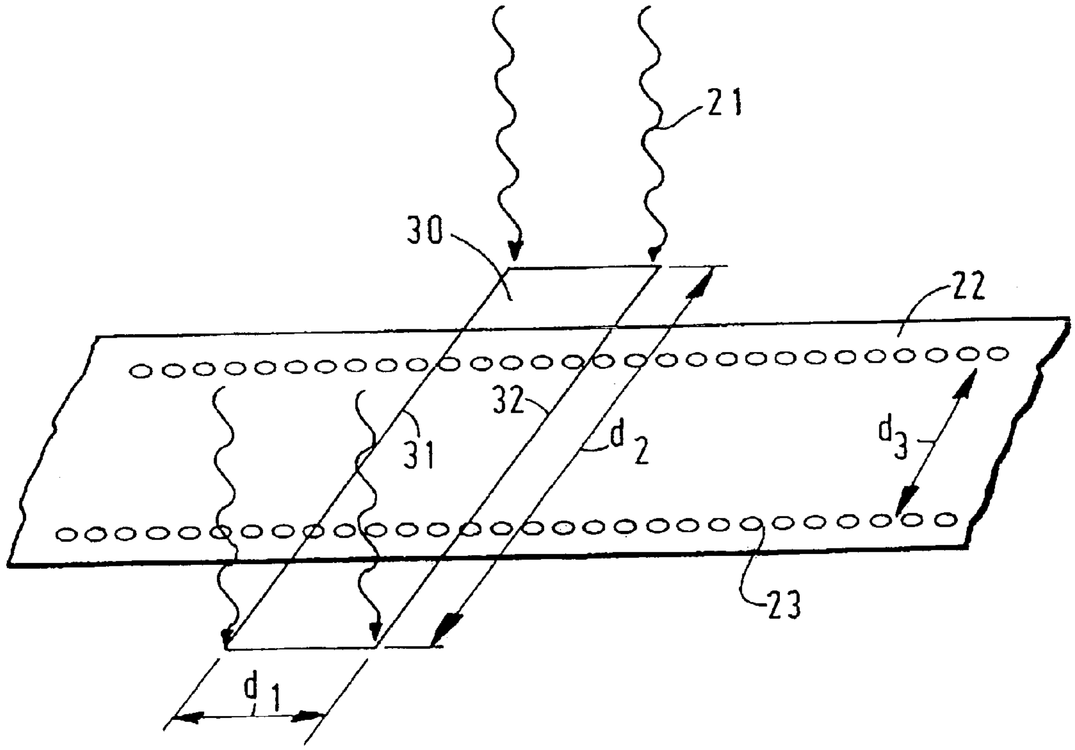
FIG. 5 is an example of a laser beam according to one preferred embodiment of the present invention.

FIG. 5 shows an example of a laser beam according to a preferred embodiment. In this embodiment, the projection 30 of the laser beam 21 on the mask 22 has a longitudinal direction. In the longitudinal direction, i.e. the direction extending transversely to the mask, the projection is defined by substantially parallel lines 31 and 32. In this embodiment, the positioning of the beam with respect to the mask in a transverse direction to the mask may be less accurate, because the beam is substantially of equal width over the entire length of the projection. This offers advantages particularly if a number of laser-passing elements are present in the mask next to one another (with respect to the longitudinal direction of the mask). In the example given, two rows of elements 23 are present in the mask in order to form an equal number of nozzle rows simultaneously in an element (not shown). Since the projection 30 of beam 21 at the first row of elements is equally wide as at the second row, the elements in these rows will also be irradiated for an equally long time, irrespective of the positioning of the beam with respect to the mask. If the projection were round, for example, a very accurate position of the beam with respect to the mask would be necessary for the purpose. If there were more than two rows of elements 23, a round projection would not even reach such a situation.

In a typical example, the width d1 of the projection is 7.5 mm. The length d2 is 24 mm. This laser beam is used to irradiate a mask in which the distance d3 between the element rows is approximately 20 mm. The radiation-passing elements 23 typically have a round shape with a cross-section of about 100 μm. The distance between the elements 23 is typically 1000 μm. If the sub-beams are imaged with a reduction factor of three by use of a lens, the resulting nozzle element has two parallel rows of nozzles at a distance of about 6.5 mm from one another, the nozzles having a cross-section of about 30 μm and the nozzles within a row having a distance of about 330 μm with respect to one another. A row of this kind is also referred to as a row having a resolution of 75 nozzles per inch (75 .p.i.). Since two such rows are staggered with respect to one another, the resulting nozzle element has a net resolution of 150 nozzles per inch.

FIG. 6 shows the angle error for a number of print heads depending on the nozzle element used.

Figure 6A:
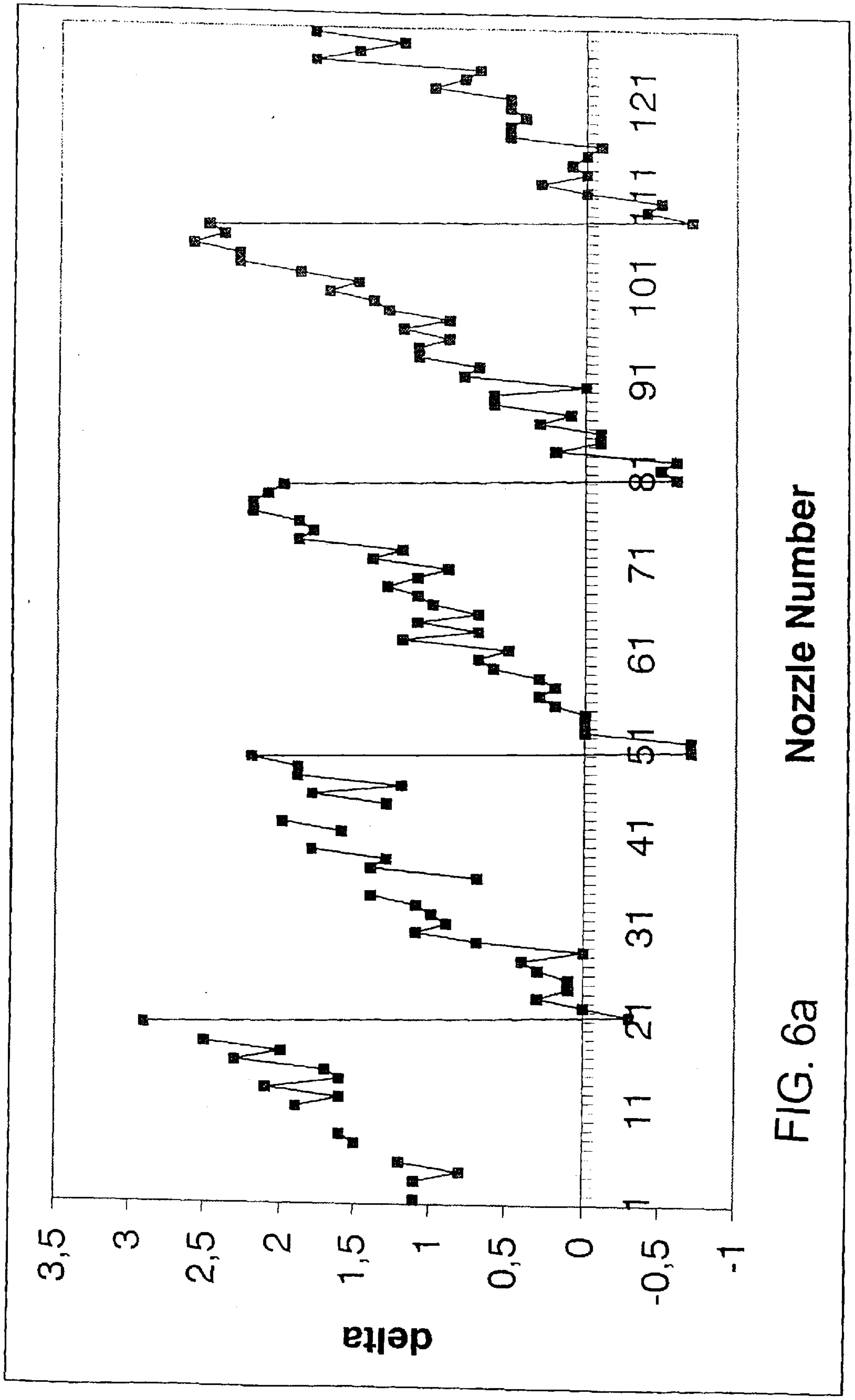
FIGS. 6*a* and 6*b* show the angle error for a number of print heads depending upon the nozzle element used.

In FIG. 6*a* the angle error is shown for a nozzle element made with the method known from the prior art. An angle error occurs when an ink drop leaves the nozzle element at an angle other than intended. As a result, the ink drop is delivered a certain distance away from the required pixel position on a receiving material. This distance is termed the angle error. The angle error may be positive (drop too high) or negative (drop too low). In this example, the angle error is shown as a dimensionless unit "delta" as a function of the nozzle number.

In FIG. 6*a*, the angle error refers to a plastic nozzle element with a length of 128 nozzles and a resolution of 75 n.p.i. To form the nozzles use is made of a laser beam and mask with which 29 nozzles can be formed in the element per step. The spread in the angle error over the nozzles is shown in the drawing. It will particularly be apparent that there is a recurrent pattern in the angle error, the period being equal to the number of nozzles formed per step. If this nozzle element is used to make a print head of an ink jet printer with which an image is printed on a receiving material, these errors result in visible printing artefacts in the image. It has been found that with the known method there are, in particular, errors in the drop size in addition to angle errors, recurrent patterns again occurring. These can also lead to disturbing print artefacts in a printed image.

Figure 6B:
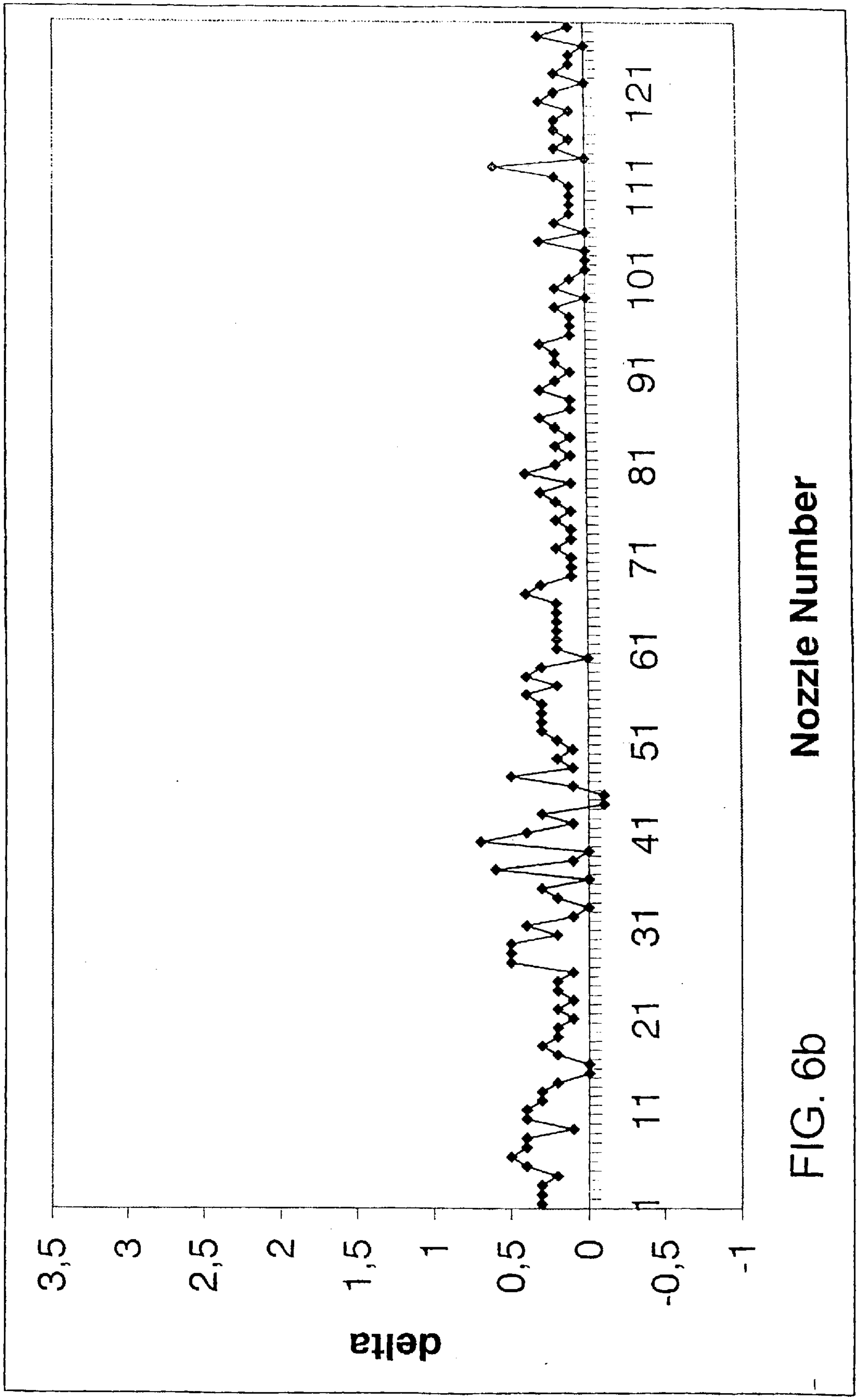

FIG. 6*b*, like FIG. 6*a*, shows the angle error of a comparable nozzle element, made, however, by the method shown in FIG. 4. It will be clear that the nozzles significantly give rise to the same ejection angle for the ink drops and no recurrent errors are visible. Closer examination shows that other properties of the ink drops, particularly the drop size, are practically the same. This advantage is noticeable particularly with relatively long nozzle rows.

It will apparent that with nozzle elements made by the method of the present invention the spread in the deviations over the nozzles is much smaller and that there are no recurrent error patterns within a single nozzle row. As a result, there will be far fewer and smaller deviations in the drop formation with print heads in which such nozzle elements are used. This will result in a better quality of the printed image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of forming a nozzle in an element for an ink jet print head, wherein material is removed from said element by the use of a laser to form the nozzle, which comprises irradiating a mask with a laser beam whereby a sub-beam is passed through the mask, said material being removed by means of the sub-beam, wherein the laser beam is moved with respect to the mask in a direction substantially parallel to the mask so that the sub-beam during the removal of the material originates from a series of different parts of the laser beam, said series extending in the said direction.

2. The method according to claim 1, wherein the series forms a contiguous row.

3. The method according to claim 1, wherein the series extends over substantially the entire width of the beam in the said direction.

4. The method according to claim 1, wherein the laser beam is moved with respect to the mask at a substantially constant speed.

5. The method according to claim 1, wherein the mask and the element are moved while the laser beam is stationary.

6. The method according to claim 1, wherein the sub-beam is imaged on the element by a means of a lens.

7. The method according to claim 1, wherein at least two sub-beams are passed through the mask.

8. The method according to claim 1, wherein more nozzles are formed in the element than there are sub-beams passed through the mask.

9. The method according to claim 1, wherein a laser beam is used in such a manner that a projection of the laser beam on the mask has a longitudinal direction, the projection being limited in the longitudinal direction by substantially parallel lines.

* * * * *